Nov. 4, 1930.                    E. J. SVENSON                    1,780,607
                             TOOL SUPPORT FOR LATHES
                                Filed March 28, 1929
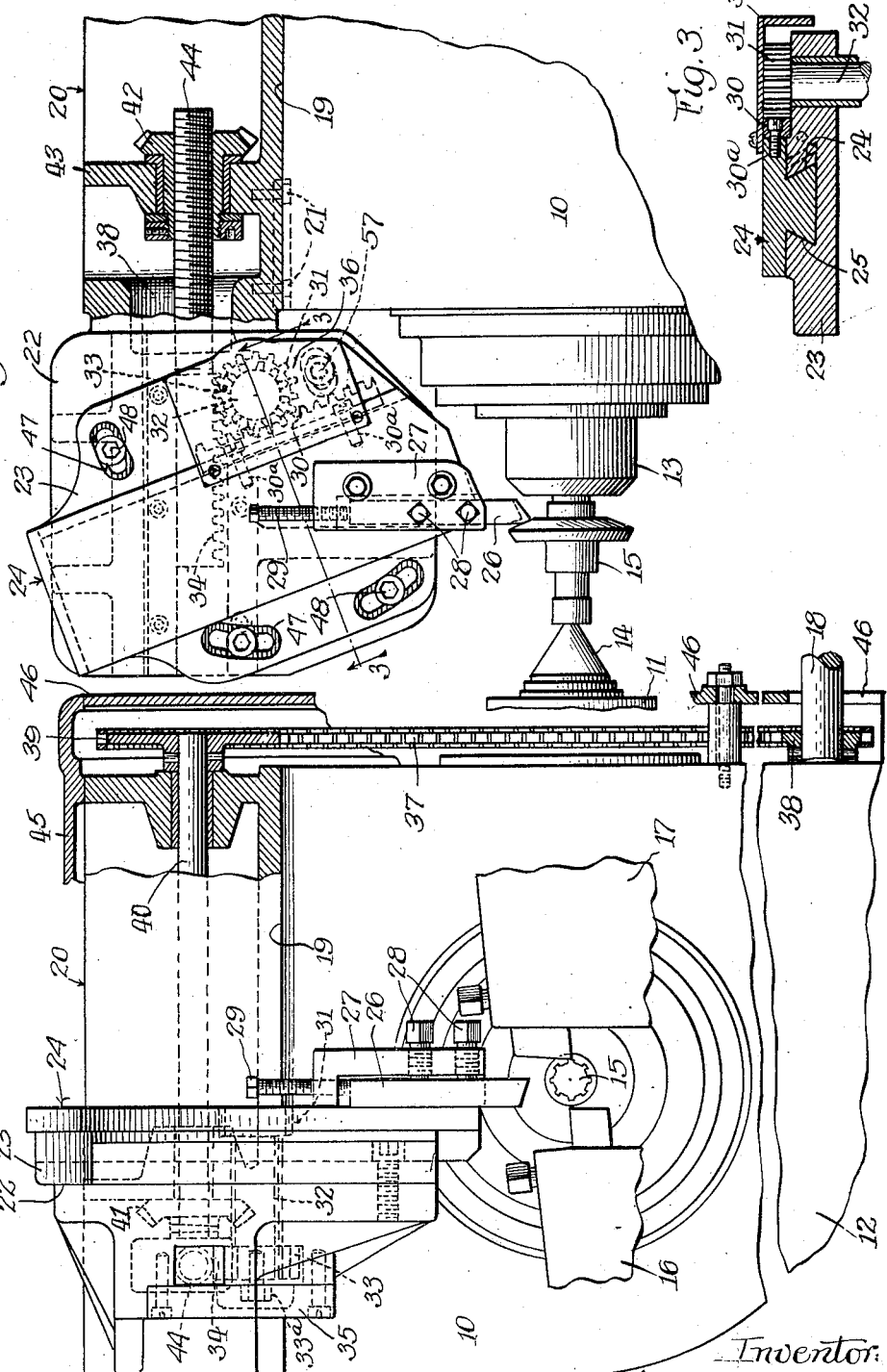
Inventor
Ernest J. Svenson Patented Nov. 4, 1930

1,780,607

UNITED STATES PATENT OFFICE

ERNEST J. SVENSON, OF ROCKFORD, ILLINOIS, ASSIGNOR TO SUNDSTRAND MACHINE TOOL CO., OF ROCKFORD, ILLINOIS, A CORPORATION OF ILLINOIS

TOOL SUPPORT FOR LATHES

Application filed March 28, 1929. Serial No. 350,477.

The invention relates generally to lathes and more particularly to an auxiliary tool carrying attachment therefor.

The principal object of the invention is to provide an attachment of new and improved construction adapted to be readily mounted on the headstock of a lathe and carrying a slide for supporting an auxiliary tool above the work for reciprocation toward and away from the work and embodying actuating means for the auxiliary tool slide which may be easily and accurately adjusted and which is adapted to be connected to the feed mechanism of the lathe.

Another object is to provide such an attachment having means for varying the angle of travel of the auxiliary tool with respect to the axis of the work so that angular facing cuts may be made therewith.

Other objects and advantages will become apparent from the following description taken in connection with the accompanying drawings, in which:

Figure 1 is a fragmental rear elevational view partially in section, of a lathe embodying the preferred form of the invention.

Fig. 2 is an end elevational view of the headstock shown in Fig. 1 as viewed from the left in Fig. 1.

Fig. 3 is a fragmental sectional view taken along the line 3—3 in Fig. 1 looking in the direction of the arrows.

While the invention is susceptible of various modifications and alternative constructions, I have shown in the drawings and have herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

As illustrated herein, the invention is embodied in a lathe of the general type shown in my copending application Serial No. 245,168 filed January 7, 1928, and having a headstock 10 and a tailstock 11 supported on a suitable bed 12. Axially alined spindles 13 and 14 are rotatably mounted in the headstock and tailstock respectively between which spindles a work piece 15 may be supported and rotated for the performance of various cutting operations thereon. Front and rear tool holders 16 and 17 are suitably mounted in a conventional manner (not shown) for movement toward and away from a work piece supported between the spindles 13 and 14.

The tool holders 16 and 17 may be automatically actuated toward and away from the work in timed relation to each other by means of a suitable feed mechanism (not herein shown) so as to impart the desired feed and rapid traverse movements to the tool holders. This mechanism may be of the character shown in said copending application and includes in the present instance a shaft 18 extending out of the rear side of the lathe bed beneath the headstock 10. Preferably the shaft 18 is operatively connected to the feed mechanism of the lathe so as to rotate in forward and reverse directions as the tool holders 16 and 17 are advanced towards and withdrawn from the work.

In order that turning, facing or chamfering operations may be performed in addition to those operations ordinarily performed by the standard front and rear tools, the invention provides an auxiliary tool support having a hollow base 20 secured on the top of the headstock and comprising a portion which projects over the spindles. The headstock 10 is preferably formed with a flat upper surface 19 upon which the base 20 is secured by screws 21.

The projecting portion of the base 20 is provided with a vertically disposed side surface 22 on which a swivel block or base 23 is adjustably secured. On the block 25 a tool slide 24 is slidably supported by undercut ways 25 formed in the swivel block and engaging complemental dove-tail ways formed on the slide 24. The swivel block 23 and the slide 24 are so positioned on the base 20 that a tool 26 carried by the slide may be moved toward and away from the work piece 15 in a plane positioned subtantially radially of the work piece. The tool 26 is supported on the tool slide by a holder 27 which holder has clamping screws 28 to engage the tool and an adjusting screw 29 for permitting radial adjustment of the tool. Thus during the movement of the auxiliary tool slide 24 the tool carried thereby is out of the way of the standard front and rear tool holders so that the tools carried by the two standard tool holders and by the auxiliary slide 24 may operate on the work piece at the same time and thus reduce the total time required for the completion of a work piece.

The auxiliary tool slide 24 is preferably actuated automatically in timed relation to the tool holders 16 and 17 by means carried in part by the support and extending downwardly along the rear side of the headstock 10, so as to be out of the way of the operator, and adapted to be connected to the reversely driven shaft 18 of the feed mechanism which drives the two tool holders 16 and 17.

The actuating mechanism for the tool slide 24 preferably includes a rack 30 secured to one side of the slide by screws 30ª in a position substantially parallel to the ways 25. This rack 30 is engaged by a pinion 31 secured on one end of a shaft 32 which is rotatably mounted in a horizontal position in the projecting portion of the base 20. This shaft extends entirely through the projecting portion of the base and at its other end a pinion 33 is removably secured thereto by a screw 33ª. The pinion 33 is engaged by a rack 34 which is slidably mounted in the base 20 for movement substantially parallel to the axis of the headstock spindle 13.

In the present instance, the rack 34 and the pinion 33 are mounted in the forward side of the base 20 and a cover plate 35 is removably secured on the forward side thereof to enclose the rack and pinion. A similar cover 36 is also provided over the pinion 32 and this cover is secured to the slide 23 so as to cover the pinion 32 throughout the entire range of movement of the slide.

The power transmitting connection between the feed mechanism of the lathe and the rack 34 is formed by means mounted on the base 20 and driven by means extending downwardly along the rear side of the headstock for connection with the lathe mechanism. In the present instance, this vertically extending means comprises a chain 37 engaging at its lower end a sprocket 38 positioned on the shaft 18 and engaging at its upper end a sprocket 39 secured on the end of a horizontal shaft 40 rotatably mounted in the base 20. The shaft 40 is positioned in the base 20 so as to extend transversely of the rack 34 and has a beveled gear 41 thereon engaging a similar beveled gear 42 rotatably mounted in a vertical cross-web 43 formed in the base. The beveled gear 42 is fixed against longitudinal movement and is interiorly threaded to engage a screw 44, one end of which is secured to the rack 34. Thus when the shaft 18 is rotated in opposite directions the tool slide 24 will be moved toward and away from the work.

The top of the base 20 is preferably closed by a removable top wall 45 so that access may be had to the various gears contained within the base and a guard 46 is preferably secured to the top wall 41 of the base so as to project downwardly along the side of the headstock 10 to cover the chain 37 and the two sprockets 38 and 39.

After the actuating mechanism has been initially connected to the shaft 18 it is often desirable to vary the extent of the inward radial movement of the tool. It is contemplated that this adjustment may be made most advantageously by removing the gear 33 from the shaft 32 to obtain a rough adjustment of the slide 24 and then adjusting the tool 26 on the slide 24 so as to obtain an accurate setting of the tool.

In the preferred form of the invention the swivel block 23 is mounted on the base 20 in such a manner that the direction of travel of the tool slide 24 may be varied. To this end as shown in Fig. 3, the swivel block is mounted for pivotal movement about the axis of the shaft 32. A plurality of elongated arcuate slots 47 are formed in the block 23 centered on the axis of the shaft 32 and a plurality of bolts 48 extend through the slots and engage the projecting portion of the base 20. Thus the block 23 may be moved about the axis of the shaft 32 and may be secured in any adjusted position by means of the bolts 48. Since the swivel block moves about the axis of the shaft 32, the relation of the rack 30 to the pinion 31 remains unchanged during adjustment of the block so that the tool slide 24 may be reciprocated in any adjusted position.

From the foregoing, it will be apparent that the invention provides a tool carrying attachment which may be readily secured in an operative position on a standard lathe so as to augment the tools normally carried by the lathe by performing additional cutting operations during the same operating period, thus making it possible to produce work pieces requiring an exceedingly large number of varied cuts without re-chucking the work or changing tools. By this arrangement the accuracy of the finished work piece is assured.

It will also be evident that the invention provides an advantageous actuating mechanism for the auxiliary tool slide since it is arranged for connection with the actuating or feed mechanism of the lathe to which it is attached and takes advantage of the varying automatically controlled tool movements usually obtained thereby. It will also be noted that this connection between the auxiliary slide and the lathe actuating mechanism is arranged so that it may be made exteriorly of the lathe frame without material disassembly of the lathe and in a location wherein the parts are out of the way of the operator.

It will also be seen that the invention provides an advantageous means for performing an angular facing operation (as required, for example, on a bevel gear) which cannot be attained by the use of the customary tool holders without sacrificing the normal function for which such tool holders are used.

I claim as my invention:

1. In a lathe having a bed with a headstock thereon, a work supporting spindle rotatably mounted in said headstock, and a reversible feed shaft mounted in and projecting transversely out of said bed, the combination of a tool carrying attachment comprising a base removably secured on the top of said headstock and extending over the work supporting end of the spindle, a tool slide reciprocably supported on the projecting portion of said base for movement radially of the work, means mounted in said base for moving said tool slide including a transverse shaft projecting rearwardly from said base beyond the rear side of the headstock, a pair of sprockets, one on each shaft positioned immediately adjacent to the side of the headstock, and an endless chain extending along the side of the headstock and connecting the two sprockets.

2. An auxiliary tool carrying attachment adapted for mounting on a lathe, said attachment comprising, in combination, a base adapted to be removably secured in fixed position on the headstock of such a lathe, a tool slide reciprocably mounted on said base, means for reciprocating said slide arranged to project beyond the side of said headstock to facilitate connection with a moving part of such a lathe, and a guard carried by said base to cover the moving elements of such a connection.

3. An auxiliary tool carrying attachment for lathes comprising, in combination, a base adapted to be mounted on a lathe headstock, a tool slide reciprocably mounted on said base, and means connected to said slide for moving the same and arranged to project beyond the side of a headstock upon which said base is mounted for connection with a moving part of said lathe, said connection including a readily removable gear to facilitate adjustment of the extent of inward radial movement of said slide relatively to the work.

4. An auxiliary tool carrying attachment for lathes comprising, in combination, a base adapted to be removably mounted in fixed position on the headstock of a lathe and having a portion projecting from said base, a tool slide reciprocably mounted on one side of said projecting portion, a rack slidably mounted on the other side of said portion, means for moving said rack, a rotatable shaft mounted in and extending transversely through said portion, a rack on said slide, a pinion on said shaft so as to be accessible on one side of said portion engaging one of said racks, and a pinion on said shaft so as to be accessible on the other side of said portion engaging the other of said racks and removable from said shaft to permit radial adjustment of said slide.

5. An auxiliary tool support for lathes comprising, in combination, a base adapted to be removably secured on a lathe headstock and projecting from said base, a swivel block mounted on said base for adjustment about a horizontal axis, a tool slide reciprocably mounted on said block, and means for reciprocating said slide comprising a first shaft rotatably mounted on said axis, a rack on said slide, a pinion on said shaft engaging said rack, a second rotatable horizontal shaft mounted in said base adapted for driving connection with the feed shaft of the lathe, and speed reduction gearing mounted in said base and forming a driving connection between said first and second shafts.

In testimony whereof, I have hereunto affixed my signature.

ERNEST J. SVENSON.